United States Patent [19]

Thompson

[11] 4,441,641
[45] Apr. 10, 1984

[54] AUTOMOBILE ROOF MOUNTING BRACKET AND CARTRIDGE HOLDER ASSEMBLY

[76] Inventor: Arthur M. Thompson, 12 Waterside Ave., Northport, N.Y. 11768

[21] Appl. No.: 476,884

[22] Filed: Mar. 18, 1983

Related U.S. Application Data

[63] Continuation of Ser. No. 299,463, Sep. 4, 1981, abandoned.

[51] Int. Cl.³ .......................... B60M 7/08; B60R 7/04
[52] U.S. Cl. .............................. 224/311; 224/42.42 R; 206/387
[58] Field of Search ............... 224/311, 313, 318, 321, 224/319, 42.42 R, 42.46 R, 42.46 A, 329; 206/387

[56] References Cited

U.S. PATENT DOCUMENTS

| | | | |
|---|---|---|---|
| 2,524,617 | 10/1950 | Wyse | 224/42.42 R |
| 2,673,705 | 3/1954 | Buckley | 224/311 X |
| 3,773,378 | 11/1973 | Lewis | 224/42.42 R X |
| 3,847,316 | 11/1974 | McInnes | 224/311 |
| 3,856,192 | 12/1974 | Nelson | 224/42.42 R X |

Primary Examiner—Steven M. Pollard
Attorney, Agent, or Firm—Sprung, Horn, Kramer & Woods

[57] ABSTRACT

An assembly for supporting a tape cartridge holder in the concavity of the inside roof of a vehicle having a windshield rim and an overhead light fixture, includes a bracket having two resiliently flexible elongated members connected at one end portion of each to dispose the two members colinearly and for adjusting of the overall length of the colinear members. One member has a first blade disposed at one end for sliding between an automobile inside roof and its windshield rim and the other member as a second blade disposed at one end for sliding between an automobile inside roof and overhead light fixture attached thereto. The bracket remains in place without permanently damaging or otherwise altering the interior of the vehicle.

8 Claims, 9 Drawing Figures

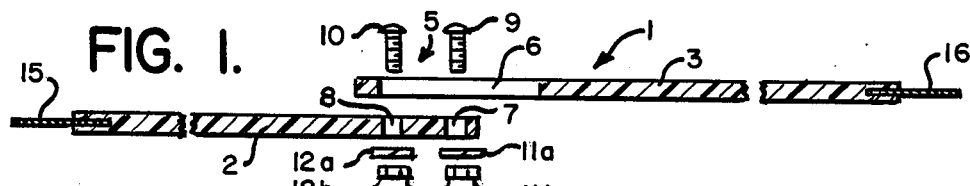
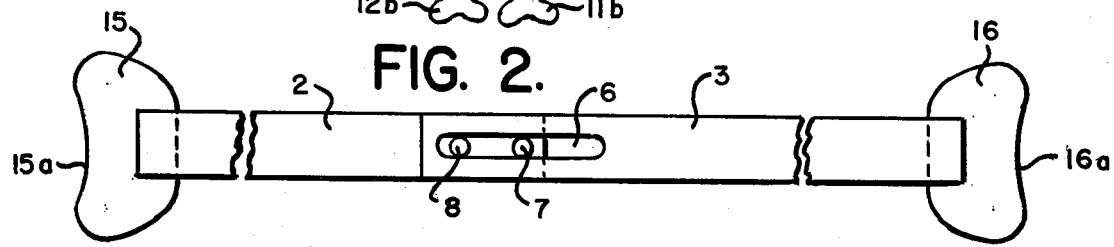
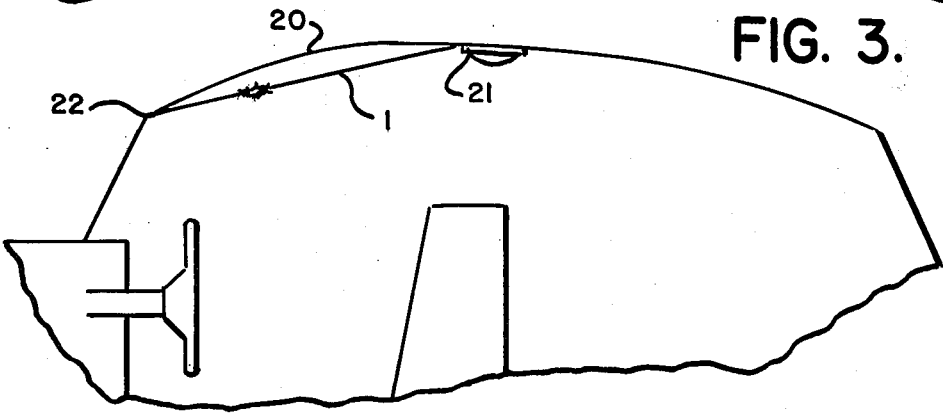
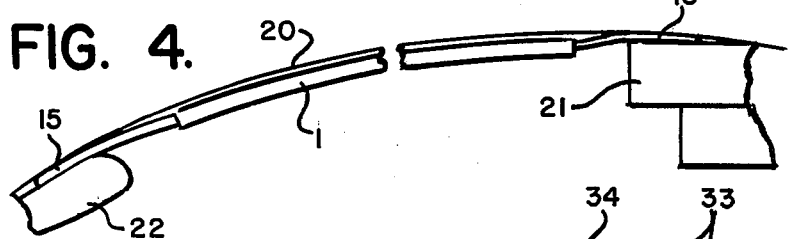
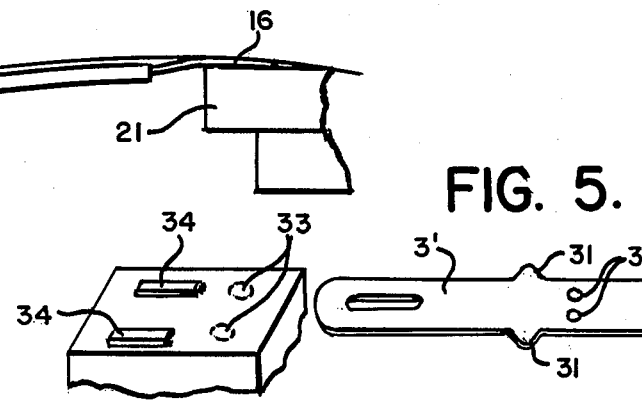
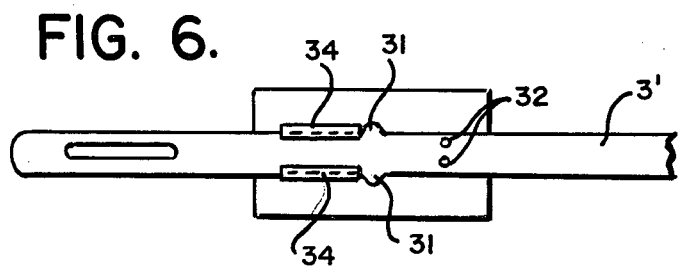
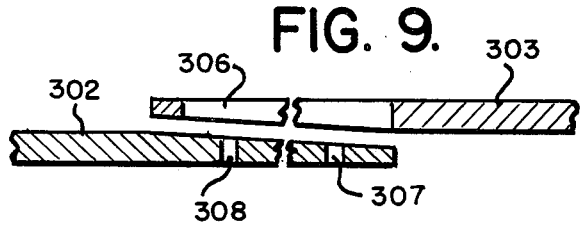

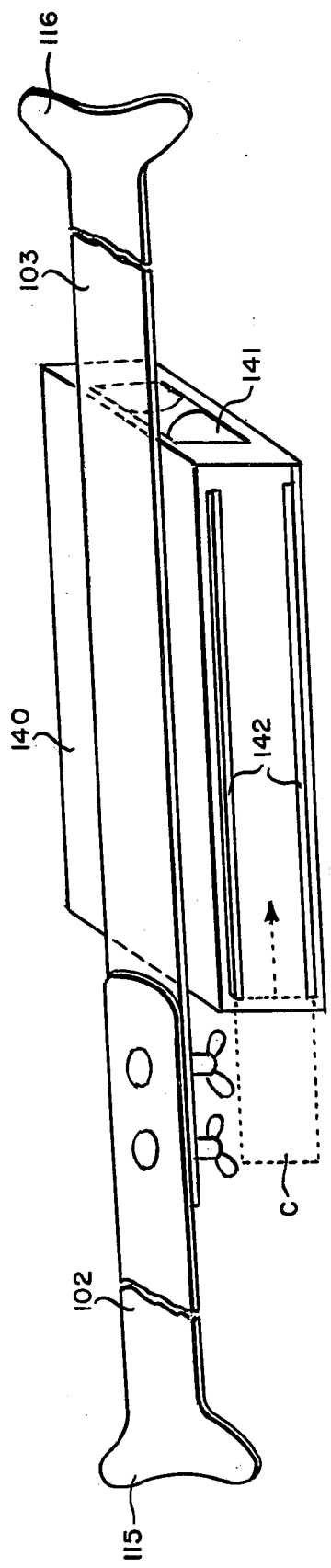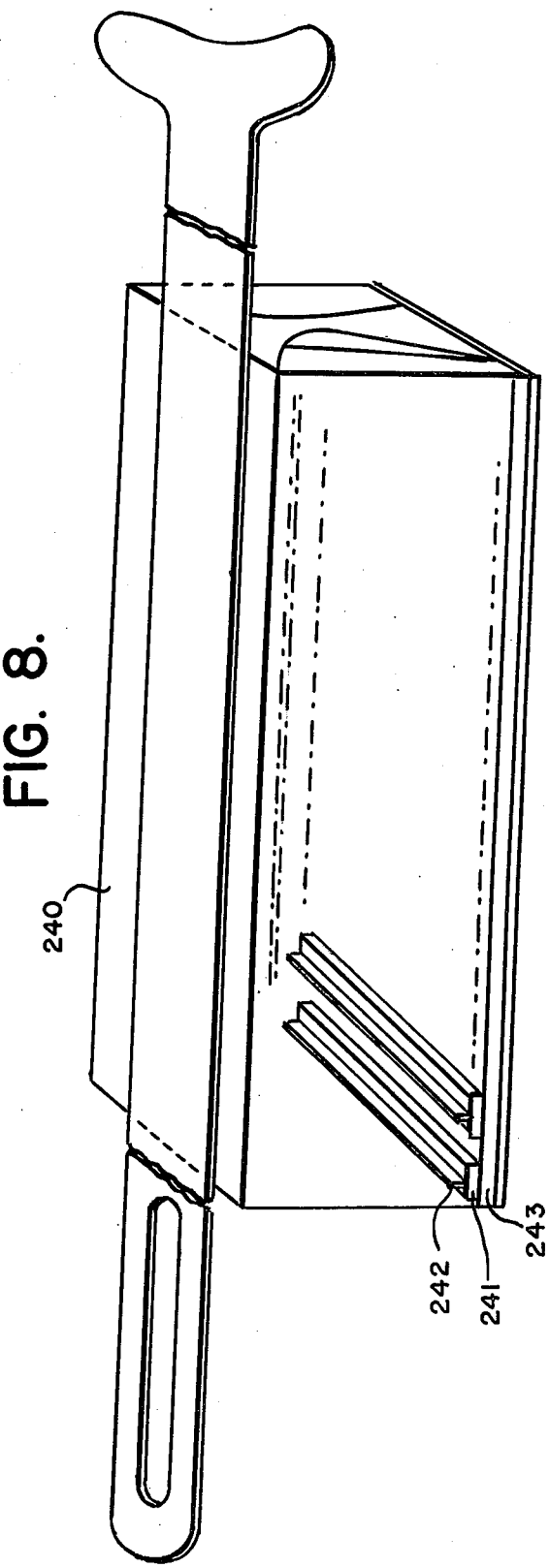

AUTOMOBILE ROOF MOUNTING BRACKET AND CARTRIDGE HOLDER ASSEMBLY

This is a continuation of application Ser. No. 299,463, filed Sept. 4, 1981, now abandoned.

BACKGROUND OF THE INVENTION

The present invention relates to a mounting bracket for supporting articles on the inside roof of an automobile or other vehicle and in particular to a mounting assembly for audio cassettes within an automobile.

Audio cartridge and/or cassette containers, commonly generically called cartridge containers are generally known in the art as typified by the containers shown in U.S. Pat. Nos. 3,565,282; 3,666,337 and Des. 212,726. Additionally, cartridge holders for automobiles are generally known as shown by way of example in U.S. Pat. No. 3,409,193.

The basic disadvantage of the cartridge holders that are currently available for automobiles, is that they are generally too large for the space available in the increasingly smaller foreign and American cars. Thus the cartridge holders that are mounted under the dash will interfere with the leg room of the passenger in the car and those which are made to fit on the center hump of the automobile encroach on the available space for both the driver and the passenger.

SUMMARY OF THE INVENTION

The main object of the present invention is to provide a cartridge holder assembly which is easy to mount and dismount and which can be connected to the inside roof of the automobile without intruding upon the available physical space of the occupants or the external visibility.

Another object of the present invention is to provide a mounting bracket for mounting conventional tape cartridge containers and/or other articles such as CB radio on the inner roof of a foreign or domestic automobile or other vehicle with a cab or compartment.

These and other objects of the present invention are provided in accordance with the present invention by a bracket which comprises two resiliently flexible elongated members having means disposed at one end portion of each for connecting the two members colinearily and for adjusting the overall length of the colinear members and wherein one member has first blade means disposed at the other end thereof for sliding between an automobile inside roof and the windshield rim thereof and the other member has second blade means disposed at the other end thereof for sliding between an automobile inside roof and an overhead light fixture attached thereto.

In a particularly advantageous embodiment of the invention, the resiliently flexible elongated members comprise plastic and the blade means comprise plastic blades which are integral with the members. The blades may also be made out of metal with the plastic elongated members molded therearound. The entire bracket can be made out of metal when it is desired to suspend heavy articles thereby.

As a result of the resilient flexibility of the elongated members, the bracket is disposed between the windshield rim and the light fixture and adjusted in length so as to be bowed outwardly into the concavity of the roof. The bracket is then pushed into place against the inner surface of the automobile roof while displacing members. Apart, resulting in the simultaneous wedging of the blades between the windshield rim and the inner surface of the roof and between the light fixture and the inner surface of the automobile roof. The resilient elongated members will thereby conform to the concavity, since this configuration tends to put the members in mechanical compression and due to the fact that this is the strongest configuration for most materials, the bracket will be able to resist downward forces of many times its own weight.

One advantage of the invention, is that the bracket when mounting an article, makes it difficult for the article to be seen from outside the vehicle. Another advantage is that the bracket can be mounted without damaging or otherwise permanently altering the interior of the vehicle.

The tape cartridge holder assembly according to the present invention thus comprises a tape cartridge box connected to the bracket so that the box will remain in place adjacent the inside roof of the automobile when the bracket is secured into place.

The tape cartridge container can be formed integrally with one member of the bracket, or can be releasably maintained thereon by various means including, but not limited to conventional fasteners.

These and other objects and advantages of the present invention will become evident when the present invention is described by way of example with reference to the following detailed description of the invention and the attached drawings wherein:

BRIEF DESCRIPTION OF THE DRAWINGS

FIG. 1 is a section view of the bracket according to the present invention;

FIG. 2 is a top view of the bracket of FIG. 1;

FIG. 3 is a partial view of the bracket and the location for installation with an automobile;

FIG. 4 shows a detail of the bracket as mounted in an automobile;

FIG. 5 is an alternative embodiment of the bracket and the means for mounting it to an article;

FIG. 6 shows the mounting of the bracket to an article according to the means of FIG. 5;

FIG. 7 is one embodiment of the tape cartridge assembly according to the present invention;

FIG. 8 is another embodiment of the tape cartridge assembly according to the present invention; and FIG. 9 shows a detail of an alternative embodiment of the bracket according to the present invention.

DETAILED DESCRIPTION OF THE PREFERRED EMBODIMENTS

Referring now to FIGS. 1 and 2, the bracket 1 according to the present invention is shown including two resiliently flexible elongated members 2 and 3 with means 5 for connecting the two members together colinearly with the possibility of longitudinal adjustment so as to select the overall length of the connection members 2, 3. The means 5 comprises these elongated slots 6 in member 3 and the mounting aperture 7 and 8 in member 2. The two members are fastened together by means of bolts 9 and 10 which are inserted through the slot 6 and hole 7 and 8 and are engaged by lock washers 11a and 12a and wing nuts 11b and 12b respectively.

At the ends of members 2 and 3 are provided blades 15 and 16 whose function will be described hereinafter. The blades 15 and 16 have preferably arcuate edges 15a, 16a and are made of a relatively thin metal such as tin or steel. In the embodiment shown the members 2, 3 are formed from plastic and are molded around the blades 15, 16 although in a preferred embodiment the blades 15 and 16 comprise plastic and are integral with members 2, 3 respectively.

The bracket 1 is shown in use in FIGS. 3 and 4 of the present application. As shown, the bracket is configured to be disposed between the windshield rim 22 and a light fixture 21 mounted on the inner surface of a generally concave automobile roof 20. The bracket 1 is put in place as shown in FIG. 3 with the blades thereof at the edge of rim 22 and the light fixture 21 and the screws 9, 10 are loosened so as to adjust the bracket 1 to the position shown in FIG. 3. The wing nuts 11b and 12b with their lock washers 11a and 12a are then tightened while the members 2 and 3 are simultaneously pushed apart, wedging the blades 15 and 16 between the rim 22 and the roof 20 on the one hand and the lighting fixture 21 and the roof 20 on the other hand. This procedure locks the bracket into the concavity of the roof. In this position, shown in FIG. 4, the bracket is capable of supporting a substantial amount of weight and thus is capable of mounting articles at the roof level out of the way of the occupants of the vehicle, out of the direct view of the those outside the vehicle and yet still easily accessible.

FIGS. 5 and 6 show an alternative embodiment of the bracket wherein an article 40, in particular a box or storage container.

In this embodiment, only the member 3' is different and includes stops 31 along the length thereof as well as dimples 32 therein which project downwardly in the view shown. The storage container 40 to be mounted comprises members 34 forming a mounting slot capable of receiving the member 3' and has depressions 33 therein which are positioned to that when the member 3' is slid through members 34, the stops 31 come in contact with members 34 and the dimples 32 engage the depressions 33 as shown in FIG. 6. As now formed, the member 3' can be connected to the aforedescribed member 2 and the assembly can be mounted in place as has been described. The storage container 40 is preferably an otherwise convention audio cassette or cartridge holder, but it will be understood by those skilled in the art that it can also be a tissue box holder, or general utility storage box for multi-purpose use.

FIG. 7 shows another embodiment of a cassette holder assembly wherein the bracket members 102, 103 have blades 115, 116 integrally formed therewith, with the remaining structure of the bracket being substantially identical with that shown in FIG. 1. Also integrally connected with the bracket member 103 is audio cassette or cartridge storage box 140 which conventionally holds cassettes or cartridges and which is moreover equipped with a tissue box holder 141 at one end and a slot 142 on the passenger side thereof for holding a card C or the like.

FIG. 8 shows a further embodiment of the cartridge or cassette holder assembly with the integrally formed bracket and cartridge holder 240 and having a cartridge or cassette holder box construction which is particularly adapted for use with an overhead mount. As shown, the box has an opened side including members 241, 242 which are configured at two different levels for alternatively holding the cartridge or cassette alone or in their individual plastic boxes. Further, a lip 243 is formed preventing the cartridges from sliding outwardly when an automobile in which the bracket assembly is mounted goes around a turn.

The cassette holder box 240 also preferably has a felt strip laid transversely across the inner surfaces thereof to keep tapes therein from bouncing around while the vehicle is in motion.

In FIG. 9, a modification to the bracket shown in FIG. 1 is shown wherein the bracket members 302 and 303 have end portions formed as incline surfaces wherein the slot 306 and the apertures 307, 308 are formed. In this manner, the bracket length can be initially adjusted to the desired length, the bracket secured into place against the car roof and thereafter the bolts can be increasingly tightened so as to achieve a further locking mechanism between the two bracket members 302 and 303 providing additional strength if necessary to support an article on the roof.

It will be apparent to those skilled in the art that various modifications can be made to the apparatus according to the present invention, but that these modifications are still within the scope of the present invention as contemplated and described herein.

What is claimed:

1. An automobile tape cartridge holder assembly comprising: a bracket comprising two resiliently flexible elongated planar members having means disposed at one end portion of each for connecting the two members colinearly and for adjusting of the overall length of the colinear members and wherein one member has first blade means disposed at the other end thereof for sliding between an automobile inside roof and its windshield rim and the other member has second blade means disposed at the other end thereof for sliding between an automobile inside roof and an overhead light fixture attached thereto; a housing; and means mounting the housing on the bracket to effect the overhead support of the housing in an automobile, comprising means slidably receiving the one end portion of one of the two members before connection to the other of the two members by the connecting means.

2. The assembly according to claim 1, wherein the slidable means comprises two L-shaped slot forming members connected at the top of the housing.

3. The assembly according to claim 1, wherein the means mounting the housing on the bracket includes means for releasably longitudinally fixing the housing to the member on which it is slidably received.

4. The assembly according to claim 3, wherein the fixing means comprises on the bracket member receiving the housing two increased width portions for limiting sliding movement and at least one dimple and the housing has at least one depression alignable with the dimple and receptive of same to retain the bracket member and housing in a relative fixed position.

5. The assembly according to claim 3, wherein the housing comprises means forming slots for holding tape cartridges in place and means for preventing the cartridges from sliding out of the slots during movement of the car.

6. The assembly according to claim 5, wherein the preventing means comprises an open side on the housing and a lip at the bottom thereof above the level at which a stored cartridge rests.

7. The assembly according to claim 3, wherein the housing further comprises means disposed on the outer walls thereof for mounting articles thereon.

8. The assembly according to claim 3, wherein the connecting means comprises a longitudinally extending slot in the one end portion of one member, two apertures in the one end portion of the other member aligned with the slot and two manually tightenable fasteners extending through the aperture and slot.

* * * * *